United States Patent Office 3,397,760
Patented Aug. 20, 1968

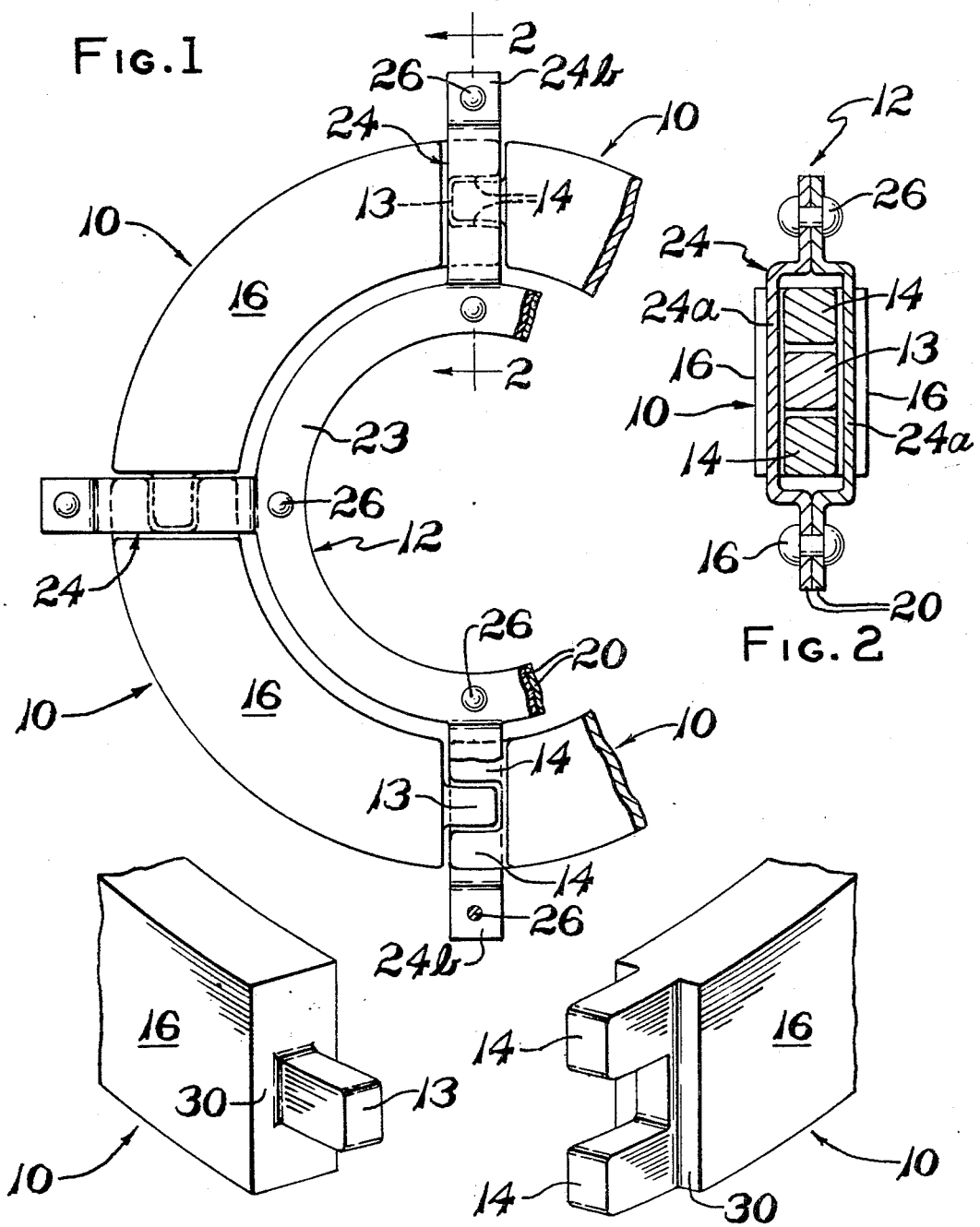

3,397,760
SEGMENTED FRICTION MEMBER
David W. Robins and William Edwin Ely, Troy, Ohio, assignors to The B. F. Goodrich Company, New York, N.Y., a corporation of New York
Filed July 5, 1966, Ser. No. 562,568
7 Claims. (Cl. 192—107)

ABSTRACT OF THE DISCLOSURE

A segmented friction disc member for use as a rotor or stator in a disc brake assembly composed of a plurality of arcuate friction lining segments which are aligned end to end in an annular assembly by interfitting mating ends on each of the segments and a spider retainer having radial projections with each of the projections loosely embracing the mated interfitting segment ends to loosely restrain the annular arrangement of segments to provide the composite segmented brake disc member.

---

This invention relates to brakes or clutches, and more especially to an improved segmented friction member useful for one or more of the interengaging friction members of a brake or clutch. In a typical disc brake, for example, this member may be either a rotor or a stator in the heat stack.

The improved friction member includes a series of arcuate segments having complementary loosely interlocking end lugs arranged so that the segments may be fitted together end-to-end to form an annulus. The segments are retained loosely in an annular assembly by an annular spider having radial projections which laterally surround and embrace the end lugs between adjoining segments. There is no positive connection between the segments and the spider. The segments are merely held together by the spider, but are otherwise unrestrained for thermal expansion either in a circumferential or radial direction. The segments are made of any of the common inorganic or organic materials useful for brake linings or clutch facings.

The spider is preferably made of two annular rigid metal parts which fit together axially so that their radial projections enclose opposite sides of the segment end lugs. The end lugs and the spider projections are collectively thinner than the thickness of the segments between their opposing rubbing faces. Accordingly the radial projections are recessed below the adjoining faces of the segments. The resulting assembly may be mounted in a brake or clutch with either the extremities of the projections of the spider, or the annular parts of the spider engaged with the associated parts of the brake or clutch.

The structure of the improved friction member provides excellent thermal dimensional stability, and is inexpensive to manufacture.

The invention will be further described with reference to the accompanying drawing which shows a preferred construction in accordance with and embodying this invention. In the drawing:

FIG. 1 is a partial axial view of the friction member assembly;

FIG. 2 is a cross section on the line 2—2 of FIG. 1; and

FIGS. 3 and 4 are partial perspective views showing the end lugs on the opposite ends of the segments.

In FIG. 1, a series of segments 10 are interfitted end-to-end in an annular array and are loosely held together by a spider 12. Each segment is arcuate and has a single medial lug 13 at one end, and a pair of radially spaced lugs 14 at the opposite end. These lugs are thinner or narrower than the intervening curved portions of the segment, on opposite sides of which are rubbing or wearing friction surfaces 16. The end lugs 13 and 14 of adjoining segments fit together very loosely so that one segment can be slightly moved relative to the other, both radially and in the arcuate direction in which the segment is curved.

Spider 12 includes two thin rigid steel stampings 20, 20 (see FIG. 2) which are of identical size and shape. Each has an interior annular body 23 with outward radial projections 24 having lateral offset portions 24a.

As shown in FIG. 2, the two spider stampings 20 mate together axially with their respective body portions 23 laterally abutting, and with the extremities 24b of the projections also abutting, so that the offset portions 24a mate to surround and enclose, loosely, the sets of interlocking end lugs 13, 14 on the segments. Rivets 26 fasten the body portions 23 of the spider to each other and also fasten together the outer extremities 24b of the radial projections.

The total thickness of the segments 10 between their friction faces 16, 16 is greater than the combined thickness of the projections 24 and the end lugs 13, 14, and the loose clearances between these parts, so that the projections are recessed below the friction faces 16, 16 of adjoining segments, and do not come into rubbing contact with associated brake or clutch parts.

Additionally, the width of the slot-like openings between adjoining segments into which the projections are recessed is slightly larger than the width of the projections, and the clearances between the lugs 13, 14 are selected so that the segments, when brought into frictional engagement with associated parts of a brake or clutch can shift arcuately until their end faces 30 (see FIGS. 3 and 4) adjoining the end lugs engage the edges of the projections.

The lateral edges of the projections 24 are parallel to the radial direction of the projections, and the edges 30 of the segments are oriented to fit flat against these edges of the projections.

The extremities 24b of the spider projections may be used as driving keys, if desired, when the friction member is to be used as a rotor disc, for example, in a high energy disc brake such as those used for aircraft. In this service, the friction member would be assembled axially into the rotatable parts of the brake (usually the wheel or parts connected to the wheel) with the extremities interlocking with complementary shaped recesses on the rotatable members in spline-like engagement. Under these circumstances, torque is transmitted to the projections 24 from the rotatable member, and in turn to the segments 10 by the engagement of the end edges 30 of the segments with the lateral edges of the projections.

Similarly the extremities 24b may be assembled in spline-like engagement with a non-rotatable part of a brake to serve as a stator. In this service, when a rotating friction braking member is pressed axially against the faces 16 of the segments, the segments are displaced axially a slight amount until their leading end edges 30 abut the projection edges, the projections then serving to resist torque applied to the segments.

The friction member may also be rotated, or held against rotation by providing driving lugs (not shown) on the inner annular portions 23 if desired, if the design of the associated brake or clutch parts so require. Such lugs may be in the form of additional rigid parts fastened to portions 23, or slots or grooves may be cut into the portions 23.

Although the segments 10 are free to rattle loosely inside the spider 12, they cannot be removed from the spider after the two stampings 20 are riveted together. The friction member is therefore very easily assembled or disassembled in a brake or clutch unit.

In making the friction member, one of the spider stampings 20 is laid horizontally and then the segments 10 are laid in position over it with their end lugs interlocking. Then the second spider stamping 20 is laid over the segments and riveted as shown to the lower stamping. The procedure is quick and inexpensive, and requires a low order of mechanical skill.

Any number of segments 10, and a corresponding number of projections 24 on the spider may be used in any friction member.

Variations in the structure disclosed may be made within the scope of the appended claims.

What is claimed is:

1. A segmented friction member for a brake or clutch comprising a series of arcuate segments having integral interfitting ends, with the segments adapted for assembly end to end with the mating interfitting ends loosely engaging each other, and a spider having a series of projections loosely embracing the opposing exposed surfaces of said interfitting ends for retaining said segments in said end-to-end assembly, and means for engaging said segments with said projections to oppose arcuate displacement of said segments relative to said projections.

2. A segmented friction member as defined in claim 1 wherein said segments have interfitting end lugs thinner than the intervening portions of the segments, said projections surrounding said end lugs and being engageable with end faces of said segments adjoining said end lugs.

3. A segmented friction member as defined in claim 2 wherein the combined thickness of said end lugs and projections and clearances therebetween is less than the thickness of the portions of the segments between said projections.

4. A segmented friction member as defined in claim 1 wherein the projections have extremities extending outwardly from the segment ends for accepting or transmitting torque loads to and from the segments collectively.

5. A segmented friction member as defined in claim 2 wherein each segment has at one end a medial lug and at its opposite end two radially spaced lugs between which such medial lug of an adjoining segment is adapted for loose interfitting engagement.

6. A segmented friction member as defined in claim 1 wherein said segments are adapted for assembly into an annulus, and wherein said spider has an annular rigid body with said projections extending radially therefrom to encircle the interfitting adjoining ends of the segments.

7. A segmented friction member as defined in claim 6 wherein said spider comprises two axially mating rigid members each having mating projections extending radially across opposite sides of the interfitting ends of said segments and means for fastening the extremities of said segments to each other at a location beyond one arcuate edge of said segments, and means for fastening said rigid members to each other at a location beyond the other arcuate edge of said segments.

References Cited

UNITED STATES PATENTS

| | | | |
|---|---|---|---|
| 2,423,882 | 7/1947 | Frank | 188—218 |
| 2,933,162 | 4/1960 | Trevaskis et al. | 188—218 |
| 3,022,876 | 2/1962 | Frankel | 192—107 X |

BENJAMIN W. WYCHE III, *Primary Examiner.*